(12) United States Patent
Merton et al.

(10) Patent No.: US 7,711,619 B2
(45) Date of Patent: May 4, 2010

(54) GRAPHICAL USER INTERFACE FOR RETIREMENT INCOME PLANNING

(75) Inventors: Robert Merton, Cambridge, MA (US);
 Roberto Mendoza, New York, NY (US);
 Peter Hancock, Rye, NY (US); Zvi Bodie, Boston, MA (US)

(73) Assignee: Integrated Finance Limited, New York, NY (US)

( * ) Notice: Subject to any disclaimer, the term of this patent is extended or adjusted under 35 U.S.C. 154(b) by 201 days.

(21) Appl. No.: 11/531,978

(22) Filed: Sep. 14, 2006

(65) Prior Publication Data

US 2007/0061237 A1 Mar. 15, 2007

Related U.S. Application Data

(60) Provisional application No. 60/717,479, filed on Sep. 15, 2005.

(51) Int. Cl.
 *G06Q 40/00* (2006.01)
 *G06F 3/00* (2006.01)
(52) U.S. Cl. ........................ 705/35; 705/36 R; 715/700
(58) Field of Classification Search ................... 705/35, 705/36 R, 1, 14, 26; 707/102, 104.1; 715/810, 715/839, 700
 See application file for complete search history.

(56) References Cited

U.S. PATENT DOCUMENTS

| | | | |
|---|---|---|---|
| 5,523,942 A | 6/1996 | Tyler et al. | |
| 5,918,217 A | 6/1999 | Maggioncalda et al. | |
| 5,956,691 A | 9/1999 | Powers | |
| 6,012,044 A | 1/2000 | Maggioncalda et al. | |
| 6,064,984 A | 5/2000 | Ferguson et al. | |
| 6,684,190 B1 | 1/2004 | Powers et al. | |
| 2002/0138386 A1* | 9/2002 | Maggioncalda et al. | 705/36 |
| 2002/0156710 A1* | 10/2002 | Ryder | 705/35 |
| 2002/0198810 A1* | 12/2002 | Roger | 705/36 |
| 2003/0018748 A1* | 1/2003 | McKenna, Jr. | 709/219 |
| 2003/0050883 A1* | 3/2003 | Weir et al. | 705/35 |
| 2003/0078869 A1 | 4/2003 | Williams | |
| 2003/0191672 A1* | 10/2003 | Kendall et al. | 705/4 |
| 2004/0158517 A1 | 8/2004 | Mahaney et al. | |
| 2005/0044028 A1 | 2/2005 | Torres | |
| 2005/0060251 A1* | 3/2005 | Schwartz et al. | 705/35 |
| 2005/0137953 A1 | 6/2005 | McDonough et al. | |
| 2007/0027736 A1* | 2/2007 | Reynolds et al. | 705/8 |

OTHER PUBLICATIONS

Gildner, Scott "High-Tech Arrival Redefining Pension Administration Roles" Mar. 1992, Pension World v28n3 pp. 10, 12.*

(Continued)

*Primary Examiner*—Kelly Campen

(57) ABSTRACT

A graphical user interface for guiding a user through the planning of an income stream includes one or more user input fields for receiving data from the user, where the data relates to user preferences regarding the income stream. Additionally, the graphical user interface includes at least one graph region for graphically displaying to the user the likelihood that the user will achieve a desired outcome based on the data provided to the user input fields. The graphical user interface thus assists the user in making informed decisions regarding his or her retirement goals and the necessary investments he or she must make in order to meet those goals.

20 Claims, 12 Drawing Sheets

OTHER PUBLICATIONS

Katinsky, Barbara "Pension World's 1993 software product directory" Mar. 1993, Pension World v29n3 pp. 27-52.*

Schwartz, Susana "Discovering the Americas" Jul. 1995 Insurance & Technology v20n7 pp. 36-40.*

Anonymous "Buck Consultants Inc. ( Buck Consultants, benefit systems manager, posted 1995 revenues of $196 mil and had total of 1,880 staff members )" Mar. 18, 1996 Business Insurance , v 30 , n 12, p. 24+.*

PCT Search Report and Written Opinion from PCT/US06/36105 dated Aug. 31, 2007, copy consists of 6 unnumbered pages.

* cited by examiner

300   $304_1$ ◯ Simplified Form
      $304_2$ ◉ Detailed Form

Simplified form:

| Your Income: | Monthly: | Annual: | Estimated Growth Rate: | |
|---|---|---|---|---|
| Summary post-retirement income: (?) | $ 3750 | $ 45000 | 3.0 % | $302_1$ |

Detailed form:

| Your Income: | Monthly: | Annual: | Estimated Growth Rate: | Start Year: | End Year: | |
|---|---|---|---|---|---|---|
| Pre-retirement gross income | $ 41667 | $ 500000 | | | | $302_2$ |
| Expected pension benefit | $ 25000 | $ 300000 | 3.0 % | | | $302_3$ |
| Estimated Social Security benefit† | $ 10000 | $ 120000 | 3.0 % | | | $302_4$ |
| Investment income (?) (ex. dividends, interest): | $ 0 | $ 0 | 3.0 % | | | $302_5$ |
| Part time income | $ 0 | $ 0 | 3.0 % | | | $302_6$ |
| Rental income | $ 0 | $ 0 | 3.0 % | | | $302_7$ |

| Your Spouse's Income: | Monthly: | Annual: | Estimated Growth Rate: | Start Year: | End Year: | |
|---|---|---|---|---|---|---|
| Pre-retirement gross income | $ 0 | $ 0 | | | | $302_8$ |
| Expected pension benefit | $ 0 | $ 0 | 3.0 % | | | $302_9$ |
| Estimated Social Security benefit† | $ 0 | $ 0 | 3.0 % | | | $302_{10}$ |
| Investment income (dividends, interest) | $ 0 | $ 0 | 3.0 % | | | $302_{11}$ |
| Part time income | $ 0 | $ 0 | 3.0 % | | | $302_{12}$ |
| Rental income | $ 0 | $ 0 | 3.0 % | | | $302_{13}$ |

| Other Income: | Monthly: | Annual: | Estimated Growth Rate: | Start Year: | End Year: | |
|---|---|---|---|---|---|---|
| Type income name here | $ 0 | $ 0 | 0.0 % | | | $302_{14}$ |

Add an income — 306

| Qualified Assets (?) | Self: | Spouse: | |
|---|---|---|---|
| 401(K) (?) and other Defined Contribution plans (457 (?), 403b (?)) | $ 100000 | $ 0 | $302_{15}$ |
| IRA (?) (Pre-tax) | $ 0 | $ 0 | $302_{16}$ |
| Cash balance plan (Defined Benefit) (?) | $ 0 | $ 0 | $302_{17}$ |

| Non-Qualified Assets (?) | Self: | Spouse: | |
|---|---|---|---|
| Roth IRA (Post-tax) | $ 0 | $ 0 | $302_{18}$ |
| Life insurance (Cash Value) | $ 0 | $ 0 | $302_{19}$ |
| Savings accounts | $ 0 | $ 0 | $302_{20}$ |
| Checking accounts | $ 0 | $ 0 | $302_{21}$ |
| Other investments | $ 0 | $ 0 | $302_{22}$ |
| Real estate value | $ 0 | $ 0 | $302_n$ |

| Other | | |
|---|---|---|
| Type asset name here | $ 0 | |

Add an asset — 312

◀ Back | Next ▶
308   310

FIG. 3A 350  356₁ ◯ Simplified Form
     356₂ ◉ Detailed Form

Simplified form:

| Your Expenses: | Monthly: | Annual: | Estimated Growth Rate: |
|---|---|---|---|
| Summary post-retirement expenses: ⓘ | $ [0] | $ [0] | [3.0] % — 352₁ |

Detailed form:

| Debt: | Monthly: | Annual: | Estimated Growth Rate: | Start Year: | End Year: |
|---|---|---|---|---|---|
| Morgage/rent† | $[500] | $[6000] | [0.0] % | | [2015] — 352₂ |
| Loan payments | $[100] | $[1200] | [0.0] % | | [2015] — 352₃ |
| Debt payments (e.g., credit cards) | $[200] | $[2400] | [0.0] % | | — 352₄ |
| Alimony/chid support | $[0] | $[0] | [0.0] % | | — 352₅ |
| Education ⓘ | $[0] | $[0] | [0.0] % | | — 352₆ |

| Necessity Items: | Monthly: | Annual: | Estimated Growth Rate: | National Average: |
|---|---|---|---|---|
| Other housing/utilities (see above for mortgage/rent) | $[250] | $[3000] | [3.0] % | — 352₆ |
| Food | $[350] | $[4200] | [3.0] % | $444 — 352₇ |
| Clothing & Personal Care | $[200] | $[2400] | [3.0] % | $145 — 352₈ |
| Transportation | $[75] | $[900] | [3.0] % | $636 — 352₉ |
| Insurance | $[175] | $[2100] | [3.0] % | $311 — 352₁₀ |

| Medical: | Monthly: | Annual: | Estimated Growth Rate: | National Average: |
|---|---|---|---|---|
| Medical: ⓘ | $[500] | $[6000] | [3.0] % | 55-65 yr old=$300/mo  65-75 yr old=$400/mo — 352₁₁ |

| Other | Monthly: | Annual: | Estimated Growth Rate: | Start Year: | End Year: |
|---|---|---|---|---|---|
| Type asset name here | $[0] | $[0] | [0.0] % | | — 352₁₂ |

[Add an asset] — 354

Income Taxes

Please enter the most likely combined federal, state, and local tax rate you expect to pay in your retirement.    ◯38% ◯35% ◯28% ◯25% ◯15% ◉Other
[10.0] % — 352₁₃

| Other Taxes | Monthly: | Annual: | Estimated Growth Rate: |
|---|---|---|---|
| Property taxes | $[0] | $[0] $ | [3.0] % — 352₁₄ |
| Miscellaneous taxes ⓘ | $[0] | $[0] $ | [3.0] % — 352ₙ |

FIG. 3B

Sample Solution

You are logged in as lexas | log out

508 — [◀ Back] [Next ▶]

Introduction >    Your Information >    Chart Your Info >    Shortfall Analysis >    Sample Solution >

Read through the recommendation below. if you like, you can go back to change the information you entered earlier in the planning process. If you're happy with the sample solution, click Next to receive quotes.

Summary

Congratulations. Based on the information you gave us, we were able to design a Smart Pension sample solution that fulfills your lifetime income requirements during retirement - including estimated taxes. This solution will provide you with a guaranteed monthly paycheck for the rest of your life.

| | |
|---|---|
| Total lifetime income shortfall | $541,658 |
| Sample solution lifetime payout | $577,996 |
| Sample solution estimated cost | $331,136 |
| Qualified assets available to fund this shortfall | $625,000 |
| Surplus qualified assets after funding shortfall | $293,864 |

— 504

— 502

Legend: Gap, Income Taxes, Sample solution

Details

| Investment Product | Total |
|---|---|
| Expected Lifetime Payout to age 85* | $577,996 |
| Lifetime Payout to age 90 | $693,595 (est) |
| Lifetime Payout to age 95 | $809,194 (est) |

Provider Quotes

PROVIDER A
Ratings (S&P: AA, A.M. Best: A++, Moody's: Aaa)

| Lifetime Income | 0% Annual Increase | 3% Annual Increase | 5% Annual Increase | Quoted Premium |
|---|---|---|---|---|
| Life With Installment Refund | ○ $120,664 | ○ $169,143 | ○ $219,323 | $602_1$ |
| Joint & Survivor with Installment Refund 50% survivor benefit | ○ $128,841 | ⦿ $185,061 | ○ $244,691 | |
| Joint & survivor with installment refund 100% survivor benefit | ○ $136,292 | ○ $199,549 | ○ $267,790 | $185,061 |
| Term Income | | | | |
| Certain Only for 15 years | | ☑ $130,404 | | $130,404 |
| Total Quoted Premium | | | | $315,465 |

Select Quote ▶
$604_1$

PROVIDER B
Ratings (S&P: AA+, A.M. Best: A++, Moody's: Aa3)

Note: Life Only and Joint & Survivor annuities from John Hancock Life provide a benefit similar to an Installment Refund by quoting Certain and Life annuities that have a Certain period which guarantees a retain of principal. Please contact us (see below)if you want exploit Installment Refund quotes

| Lifetime Income | 0% Annual Increase | 3% Annual Increase | 5% Annual Increase | Quoted Premium |
|---|---|---|---|---|
| Life With Installment Refund | ○ $130,370 | ○ $103,321 | ○ $230,732 | $602_2$ |
| Joint & Survivor with Installment Refund 50% survivor benefit | Contact Us | Contact Us | Contact Us | |
| Joint & survivor with installment refund 100% survivor benefit | Contact Us | Contact Us | Contact Us | $0 |
| Term Income | | | | |
| Fixed Period for 15 years | | ☑ $139,507 | | $139,507 |
| Total Quoted Premium | | $604_2$ | | $139,507 |

Select Quote ▶

PROVIDER C
Ratings (S&P: AA-, A.M. Best: A, Moody's: Aa3)

GRAPHICAL USER INTERFACE FOR RETIREMENT INCOME PLANNING

CROSS REFERENCE TO RELATED APPLICATIONS

This application claims the benefit of U.S. Provisional Patent Application Ser. No. 60/717,479, filed Sep. 15, 2005, which is herein incorporated by reference in its entirety.

FIELD OF THE INVENTION

The present invention generally relates to graphical user interfaces, and more particularly relates to planning a retirement income stream through a graphical user interface displayed on a computer.

BACKGROUND OF THE INVENTION

Most working individuals have retirement plans in place to support themselves financially when they retire from the workforce. Such plans generally manage and/or invest the employee's assets (sometimes including at least a portion of the employee's regular income) in order to provide financial security when the employee retires and no longer receives a regular income.

Recently, many retirement plans have shifted from defined-benefit type plans, in which a plan sponsor controls investment risk and portfolio management to minimize investment risk, to defined-contribution type plans, which give the individual more control and discretion in the investment of funds but come with increased investment risk. Unfortunately, typical defined contribution type plans often fail to provide the individual with the resources and knowledge necessary to make informed investment decisions.

Many individuals can easily visualize their desired standard of living upon retirement, but are unsure of the necessary steps to take in order to secure this desired standard. Moreover, many individuals find available investment products, such as investment contracts and annuities, complicated and intimidating, making retirement planning a daunting task.

Therefore, there is a need in the art for a graphical user interface for retirement income planning.

SUMMARY OF THE INVENTION

Embodiments of the invention generally provide a graphical user interface for retirement income planning. One embodiment of a graphical user interface for guiding a user through the planning of an income stream includes one or more user input fields for receiving data from the user, where the data relates to user preferences regarding the income stream. Additionally, the graphical user interface includes at least one graph region for graphically displaying to the user the likelihood that the user will achieve a desired outcome based on the data provided to the user input fields. The graphical user interface thus assists the user in making informed decisions regarding his or her retirement goals and the necessary investments he or she must make in order to meet those goals.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 3A illustrates one embodiment of a second window of a graphical user interface for retirement planning;

FIG. 3B illustrates one embodiment of another portion of the second window of a graphical user interface for retirement planning

FIG. 5 illustrates one embodiment of a fourth window of a graphical user interface for retirement planning; and FIG. 6 illustrates one embodiment of a fifth window of a graphical user interface for retirement planning.

To facilitate understanding, identical reference numerals have been used, where possible, to designate identical elements that are common to the figures.

DETAILED DESCRIPTION

Embodiments of the invention generally provide a graphical user interface for retirement income planning (e.g., for use in defined benefit and/or defined contribution plans). In particular, the present invention integrates a plurality of financial drivers in order to assist an individual in managing his or her assets and targeted needs (e.g., income, savings, home, medical, etc.) to ensure a desired standard of living, both while working and while retired. In one embodiment, assets and risks are managed in a manner that provides an income stream upon retirement, the income stream providing the financial means to support the desired standard of living. The graphical user interface assists the user in making informed decisions regarding his or her retirement goals and the necessary investments he or she must make in order to meet those goals.

In short, the present invention assists a user in determining the minimum standard of living he or she is willing to tolerate in retirement, estimating the cost of that minimum standard of living (factoring in a long lifetime and inflation), estimating future income (e.g., from Social Security, pensions, part-time work and other sources), and ensuring that the minimum standard of living will always be achieved (afforded) by purchasing an annuity to fill the gap between the estimated future income and the estimated expenses associated with the minimum standard of living.

Figure 1:
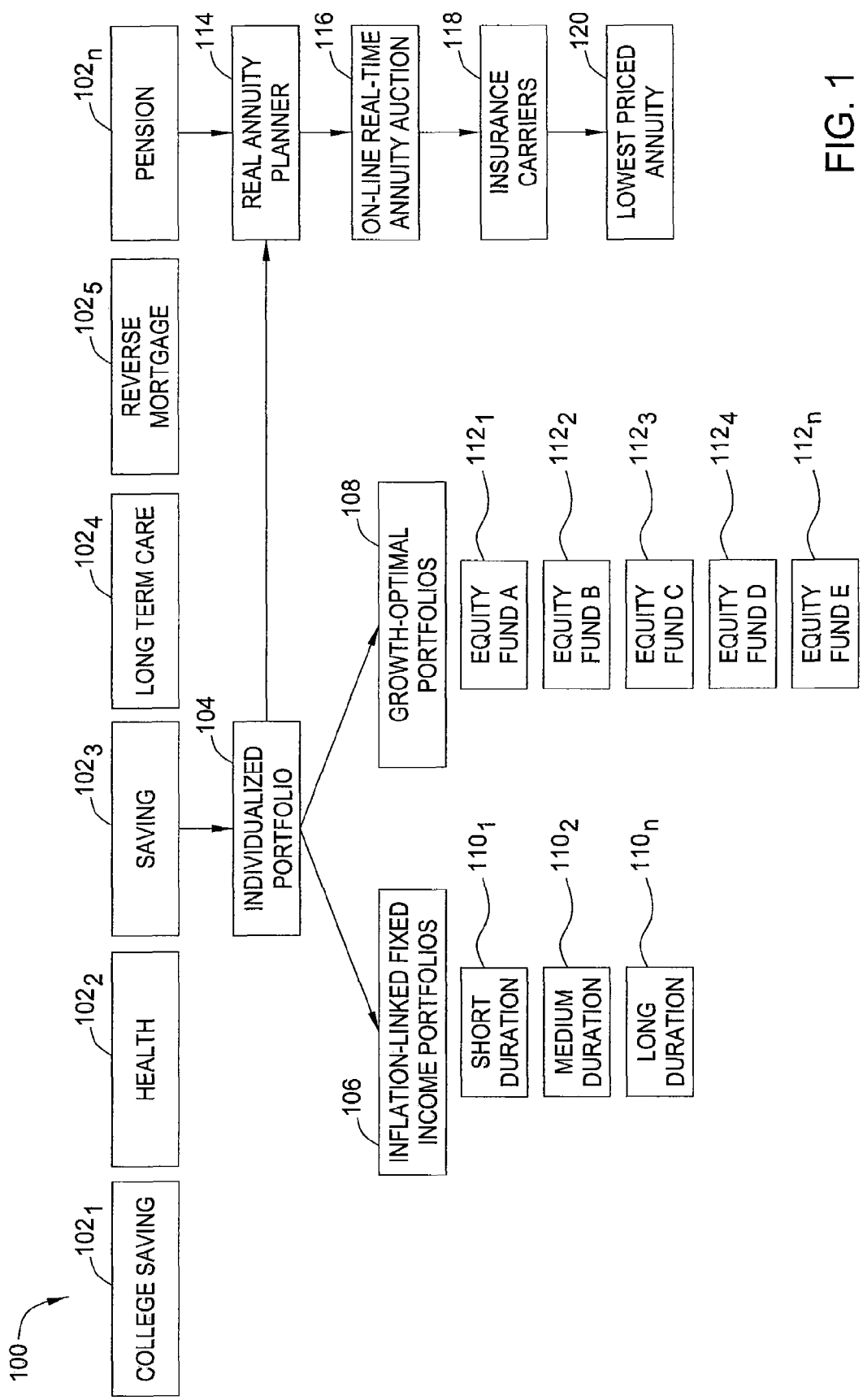
FIG. 1 is a block diagram illustrating one embodiment of a system for planning retirement income, according to the present invention.

FIG. 1 is a block diagram illustrating one embodiment of a system 100 for planning retirement income, according to the present invention. In one embodiment, the system 100 is implemented in an Internet-based platform. The system 100 comprises a plurality of financial drivers $102_1$-$102_n$ (hereinafter collectively referred to as "drivers 102"), each driver 102 configured to represent and manage a targeted need. The drivers 102 are integrated such that they may share information among themselves in order to present a complete picture of an individual's financial situation. Each of the drivers 102 may be further associated with one or more educational tools (e.g., hyperlinks to frequently asked questions, informational articles, etc., not shown) to assist a user in making informed decisions as they relate to the user's goals and the functionalities of the particular driver 102.

In one embodiment, the drivers 102 include one or more of the following: a college savings driver $102_1$ (e.g., for financing higher education needs), a health or medical needs driver $102_2$ (e.g., for bridging an employer-provided health plan and Medicare/Medicaid), a savings driver $102_3$ (e.g., for managing savings to meet retirement predefined goals), a long term care driver $102_4$ (e.g., for funding long-term medical treatment), a reverse mortgage driver $102_5$ (e.g., for deriving equity from an owned home) and a pension driver $102_n$ (e.g., for funding an income stream for retirement).

In one embodiment, the college savings driver $102_1$ is configured to finance higher education needs (e.g., tuition, books, room and board, etc.).

In one embodiment, the health needs driver $102_2$ is configured for financing health-related costs that are not covered by an existing health care plan, e.g., in the period between the expiration of an employer-provided health care plan and availability of a government-provided health care plan, such as Medicare or Medicaid.

In one embodiment, the savings driver $102_3$ is configured for managing the individual's "accumulation phase" of retirement planning, where the accumulation phase is substantially equivalent to the individual's working years (e.g., where assets are accumulated). The accumulation phase is managed such that the individual's savings meet targeted retirement goals. That is, assets are accumulated (e.g., by allocating funds among investments during the individual's working years) in a manner to generate sufficient funds to finance a desired standard of living at the time of retirement (e.g., financed by an annuity to be purchased at least in part with a lump sum, as described in further detail below)

The savings driver $102_3$ further comprises an individualized portfolio 104 reflecting investments of the individual's retirement savings. The individualized portfolio 104 is further divided into a fixed income portfolio 106 and a growth-optimal portfolio 108.

In one embodiment, the fixed income portfolio 106 comprises a plurality of inflation-linked fixed income portfolios $110_1$-$110_n$ (hereinafter collectively referred to as "fixed income portfolios 110"). For example, the fixed income portfolio 106 may comprise a short-duration fixed income portfolio $110_1$, a medium-duration fixed income portfolio $110_2$ and a long-duration fixed income portfolio $110_n$. The goal of each fixed income portfolio 110 is to invest the individual's resources in a manner to deliver a sum of money sufficient to purchase an annuity that will provide a minimum retirement income (e.g., X number of dollars per year). Each of the fixed income portfolios 110 comprises inflation-linked bonds combined with nominal government bonds and inflation derivatives or other appropriate investment vehicles. The duration and the convexity of a particular fixed income portfolio 110 hedge the real interest rate exposure. In further embodiments, the fixed income portfolio 106 comprises a synthetic deferred real annuity.

In one embodiment, the growth-optimal portfolio 108 comprises a dynamically managed set of funds in different asset classes, for example, in a plurality of diversified global equity portfolios $112_1$-$112_n$ (hereinafter collectively referred to as "global equity portfolios 112"). The managed set of funds can be created using actual index funds or using derivatives, and the choice of index can also be based on cost. Each global equity portfolio 112 comprises a combination of global equity, fixed income and other assets. For example, the global equity portfolios 112 may include one or more of a growth-optimal commodity fund, a growth-optimal corporate bond fund, a growth-optimal developed fund, a growth-optimal emerging market funds and a growth-optimal real estate fund. In one embodiment, the managed set of funds can grow or diminish over time as the user wants more or less funds managed in the growth optimal portfolio 108.

The savings driver $102_3$ is configured to allocate the individual's retirement savings among the portfolios 104, 106, 108, 110 and 112, based upon age and upon a stated risk preference, where the magnitude of the stated risk preference relates, inversely, to the value of the user's defined minimum standard of living (e.g., the lower the minimum, the greater the risk that is taken in managing the portfolio).

In one embodiment, the long term care driver $102_4$ is configured for funding long-term medical treatment that is not covered by an existing health care plan.

In one embodiment, the reverse mortgage driver $102_5$ is configured for deriving equity from an owned home, e.g., by taking out a loan against the home that does not need to be paid back for as long as the individual resides in the home. The loan amount may be used, for example, to fund some of the other financial drivers 102 (e.g., to purchase long-term care, Medicare riders, annuities, etc.).

In one embodiment, the pension driver $102_n$ is configured for managing the individual's "payout phase" of retirement planning, e.g., by constructing and funding an income stream for retirement. In particular, the pension driver $102_n$ assists an individual in measuring his or her needs and in planning out a reliable post-retirement income stream to meet those needs. For example, the pension driver $102_n$ may purchase an annuity using assets accumulated during the accumulation phase, where the annuity provides a defined income level or sum of money during each year of the individual's retirement. Alternatively, the pension driver $102_n$ may purchase annuities using funds provided by a reverse mortgage or other qualified fund sources (e.g., personal savings, individual retirement accounts, etc.).

To this end, the pension driver $102_n$ comprises a real annuity planner 114 that assists the individual in determining the size of and in purchasing an annuity to fund the post-retirement income stream. One embodiment of the real annuity planner 114 is discussed in further detail below with respect to FIG. 2. As discussed, the real annuity planner 114 is linked to an on-line, real-time annuity auction 116 that enables the individual to compare the prices of similar institutionally priced annuities provided by a plurality of insurance carriers 118. Typically, the real annuity planner 114 will assist the individual in identifying and purchasing the lowest priced annuity 120 that meets his or her needs, as determined by the real annuity planner 114. In one embodiment, the real annuity planner 114 examines both real and nominal variable annuities (including, for example, equity-indexed, inflation-linked annuities). As described in further detail in co-pending, commonly assigned U.S. patent application Ser. No. 11/531,989 which is herein incorporated by reference in its entirety, the real annuity planner 114 may be a stand-alone module as well as a module that is linked directly to the pension driver $102_3$.

Figure 2A:
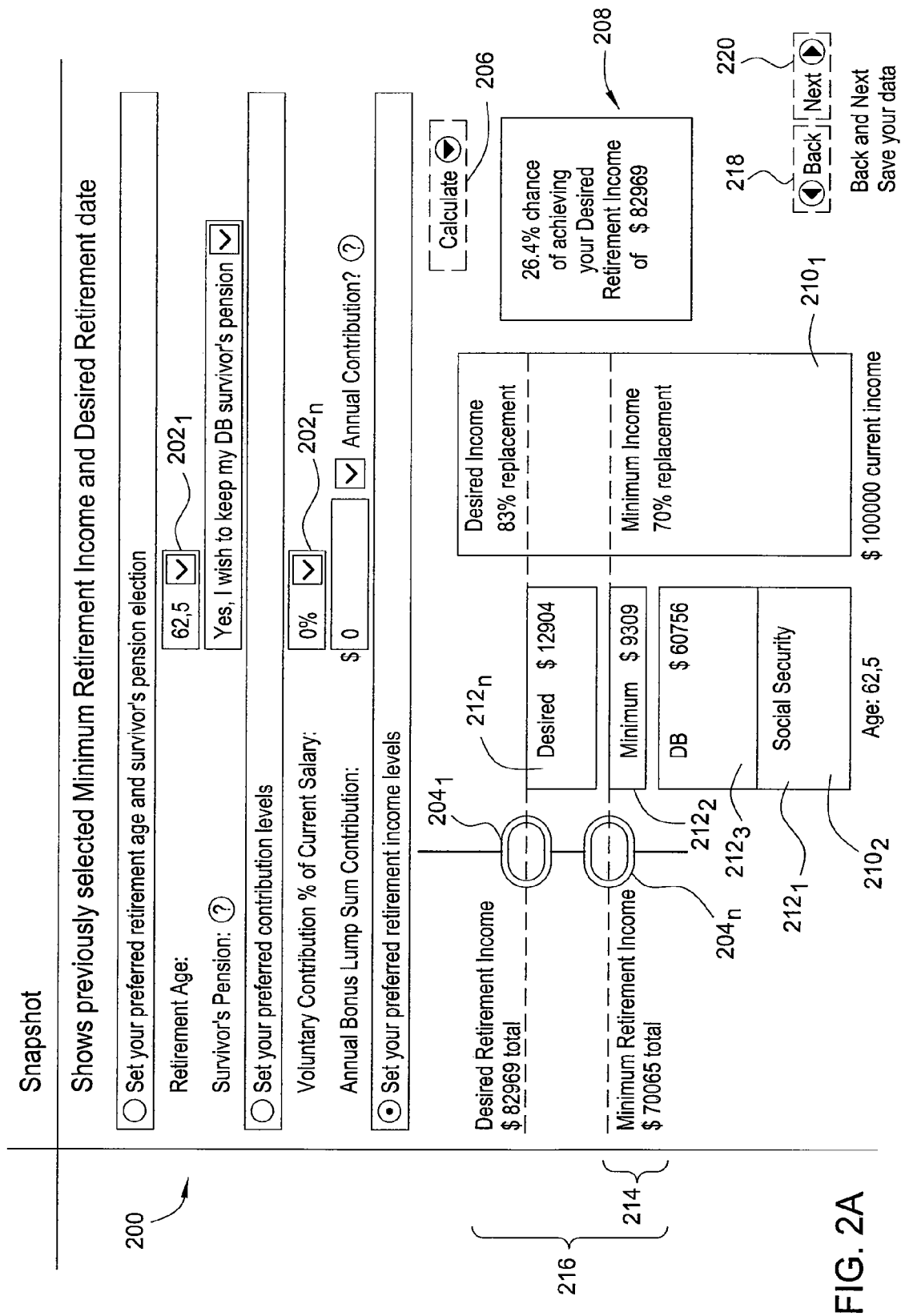
FIGS. 2A-2F illustrates one embodiment of a first window of a graphical user interface for retirement planning.

FIG. 2A illustrates one embodiment of a first window 200 of a graphical user interface for retirement planning. The window 200 may be implemented, for example, in conjunction with the savings driver $102_3$ of FIG. 1 for managing the "accumulation phase" of retirement planning (e.g., by helping the user determine how to allocate funds among investments to optimize accumulation).

In one embodiment, the window 200 is configured to determine the likelihood that the user will meet his or her retirement goals (e.g., will achieve a desired income level or standard of living), based on his or her preferences regarding, for example, retirement age and voluntary contribution level. To this end, the window 200 comprises a plurality of user input fields $202_1$-$202_n$ (hereinafter collectively referred to as "input fields 202"), a plurality of sliders $204_1$-$204_n$ (hereinafter collectively referred to as "sliders 204"), at least one calculate button 206 and at least one graph region 208.

The input fields 202 are adapted to receive user input regarding retirement planning preferences. In one embodiment, the window 200 comprises two input fields 202: a first input field $202_1$ for allowing the user to provide a preference regarding his or her desired retirement age (e.g., 62.5 years) and a second input field $202_n$ for allowing the user to provide a preference regarding his or her voluntary contribution level (e.g., 0%). Further embodiments include input fields for specifying survivor pension parameters and bonus lump sum contributions. In one embodiment, the input fields 202 are drop-down menu style fields, where the user clicks on an arrow and the input field provides a plurality of options from which the user selects one (e.g., by clicking on the selected option).

The sliders 204 are also adapted to receive user input regarding retirement planning preferences. In one embodiment, the window 200 comprises two sliders 204: a first slider $204_1$ for allowing the user to provide a desired income level (e.g., $82,969) and a second slider $204_n$ for allowing the user to provide a minimum income level on which he or she can live during retirement (e.g., $70,065). In one embodiment, the sliders 204 are buttons, where the user clicks on a button and drags the button to the desired location (e.g., corresponding to the desired income level, which updates with the dragging and is displayed in the vicinity of the button).

The calculate button 206 comprises a button adapted to trigger a calculation upon selection by the user. For example, once the user has provided all of his or her retirement planning preferences using the input fields 202 and sliders 204, he or she may click on the calculate button 206 in order to indicate that the preferences have been set. Selecting the calculate button 206 causes a calculation of the likelihood that the user will achieve his or her desired income level based on the retirement planning preferences provided. This likelihood may then be displayed graphically, for example in the graph region 208.

The graph region 208 comprises a region in which the window 200 provides a graphical or visual display that communicates the likelihood that the user will achieve his or her desired income level based on the retirement planning preferences provided. In one embodiment, this display is a bar graph style display comprising a first bar $210_1$ that illustrates the user's current annual income (e.g., $100,000, as provided by the user's employer or by the user) and a second bar $210_2$ that illustrates the user's preferences regarding desired income level and minimum income level (e.g., as indicated by use of the sliders 204).

The second bar $210_2$ may be divided into a plurality of regions $212_1$-$212_n$ (hereinafter collectively referred to as "regions 212") that indicate, for example, the user's projected yearly Social Security income (e.g., as provided by the user's employer or by the user), the user's projected yearly defined benefit (e.g., $60,756, as provided by the user's employer or by the user), the user's defined minimum income level, and the user's defined desired income level. This illustration will show how much of a gap 214 exists between the income the user is guaranteed to receive (e.g., through the Social Security and defined benefit) and the minimum income the user can live on, as well as the gap 216 that exists between the income the user is guaranteed to receive and the user's desired income level. These gaps 214, 216 are what the savings driver $102_3$ is adapted to identify and plan for.

Furthermore, the graph region 208 illustrates the calculated probabilities of the user achieving his or her desired income level based on his or her stated preferences (e.g., 26.4% of achieving). In one embodiment, the graph region 208 is further adapted to calculate and illustrate how the user's defined minimum income level and desired income level translate into percentages of the user's current annual income (e.g., 70% and 83%, respectively).

In addition, the window 200 may include a "back" button 218 and a "next" button 220. The back button 218 may, for example, allow the user to go back and modify certain information preliminary input information, such as current annual income. The next button 220 allows the user to finalize preferences illustrated in the window 200, if the user is satisfied with the calculated probability of achieving the desired income level.

If the user is not satisfied with the calculated probability of achieving his or her desired income level, or if he or she would like to see the probability of achieving a greater desired income level, he or she may change the defined preferences (e.g., regarding retirement age, voluntary contribution level, minimum income level and/or desired income level), for example by adjusting the input fields 202 and/or sliders 204, and then clicking the model button 206 to trigger a new calculation with the adjusted inputs.

Figure 2B:
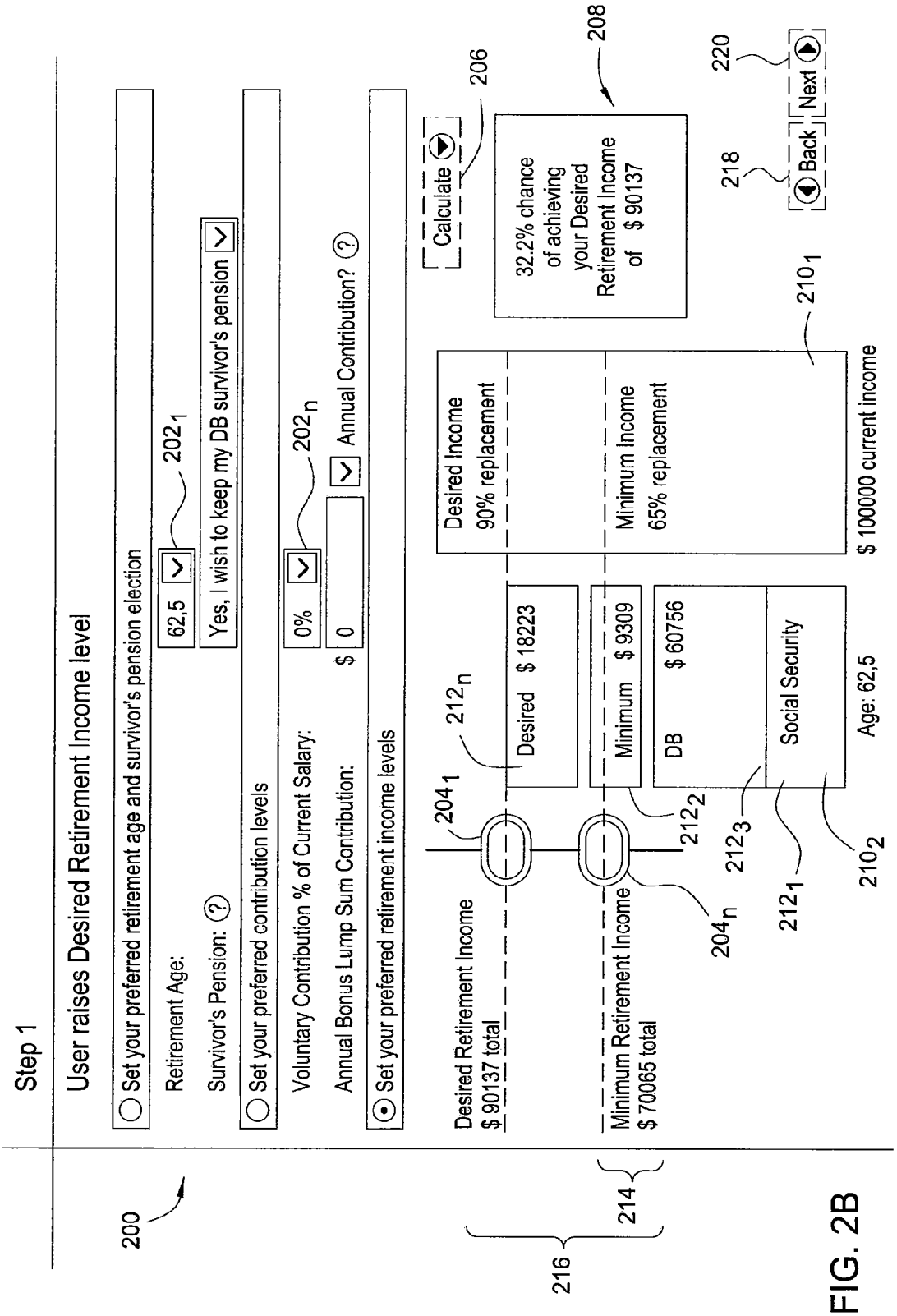

FIG. 2B, for example, illustrates the window 200 in which the user has modified the desired income level in order to determine the probability of achieving a greater desired income. Specifically, after lowering the minimum income level as described in FIG. 2B, the desired income level has been raised (e.g., to $90,137 or a 90% replacement of current annual income), for example by dragging the slider $204_1$. The recalculated probability of achieving the desired income level is now lowered (e.g., 32.2% of achieving).

Figure 2C:
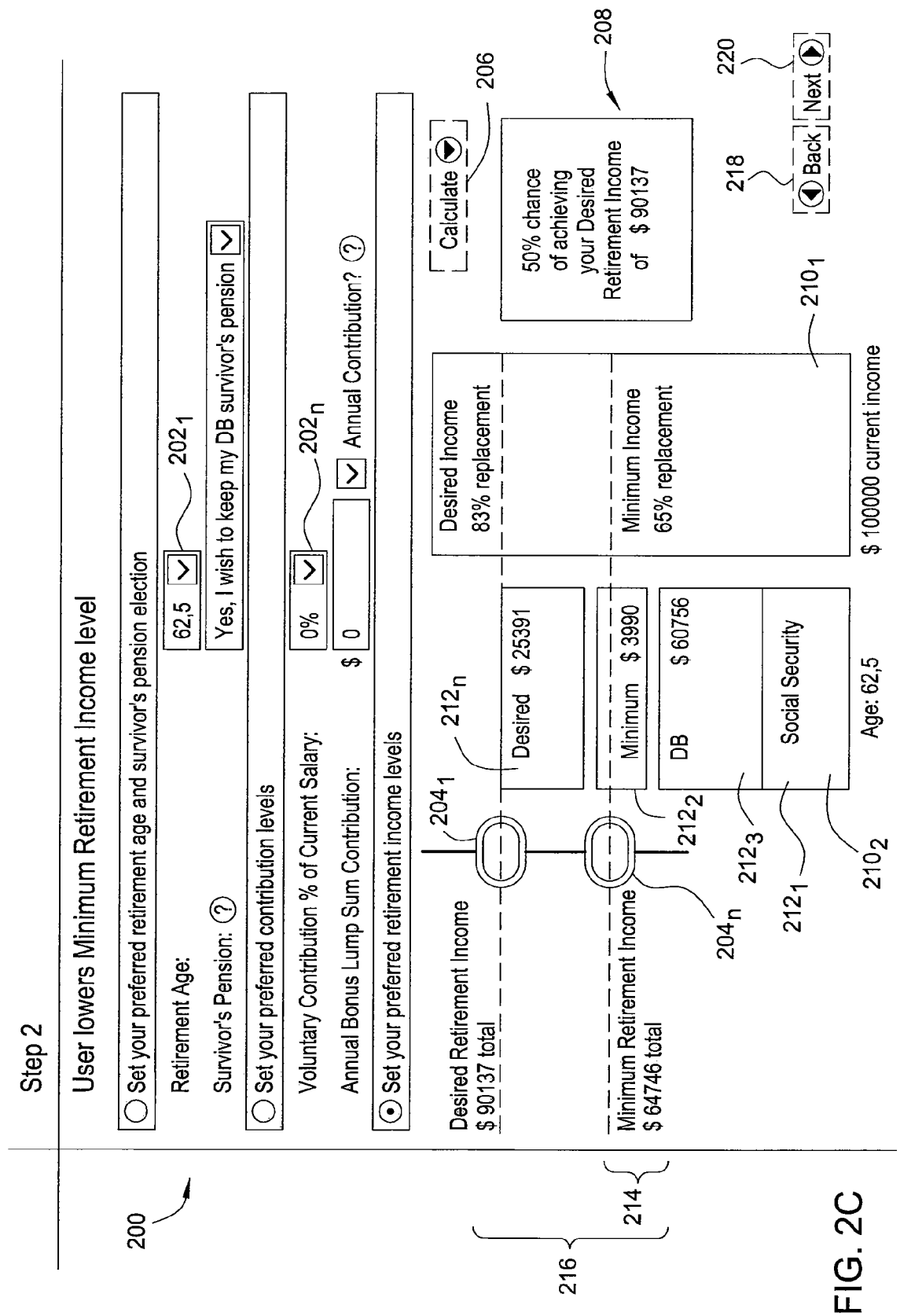

FIG. 2C, on the other hand, illustrates the window 200 in which the user has modified the minimum income level in order to improve his or her chances of achieving the desired income level. Specifically, the minimum income level has been lowered (e.g., to $64,746 or a 65% replacement of current annual income), for example by dragging the slider $204_n$. The recalculated probability of achieving the desired income level is now improved (e.g., 50% of achieving).

Figure 2D:
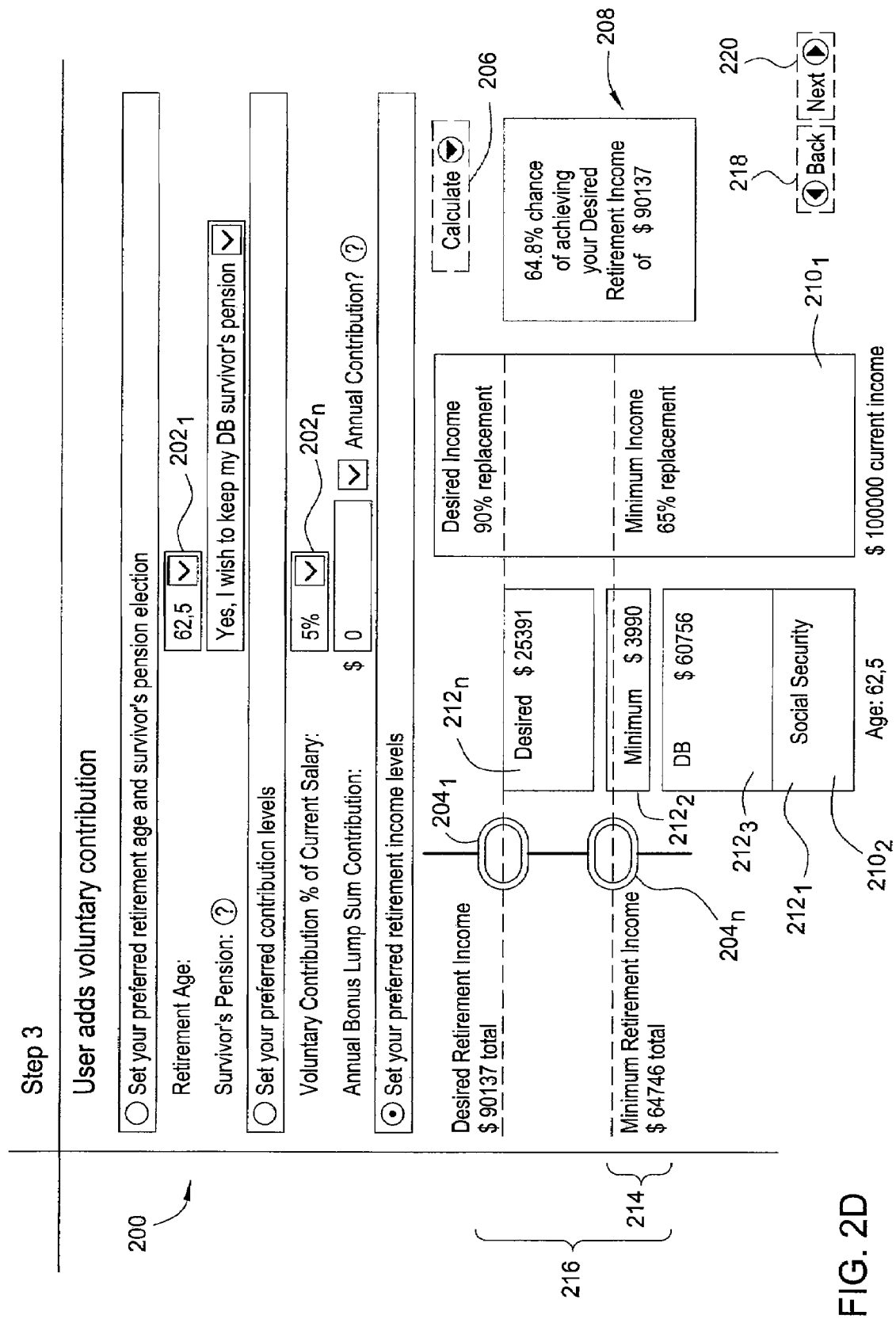

FIG. 2D, on the other hand, illustrates the window 200 in which the user has modified the voluntary contribution level in order to determine the probability of achieving the desired income level if he or she contributes to a retirement plan. Specifically, after lowering the minimum income level as described in FIG. 2B and raising the desired income level as described in FIG. 2C, the voluntary contribution level has been raised (e.g., to 5%), for example by selecting from the drop-down menu of the input field $202_n$. The recalculated probability of achieving the desired income level is now improved (e.g., 64.8% of achieving).

Figure 2E:
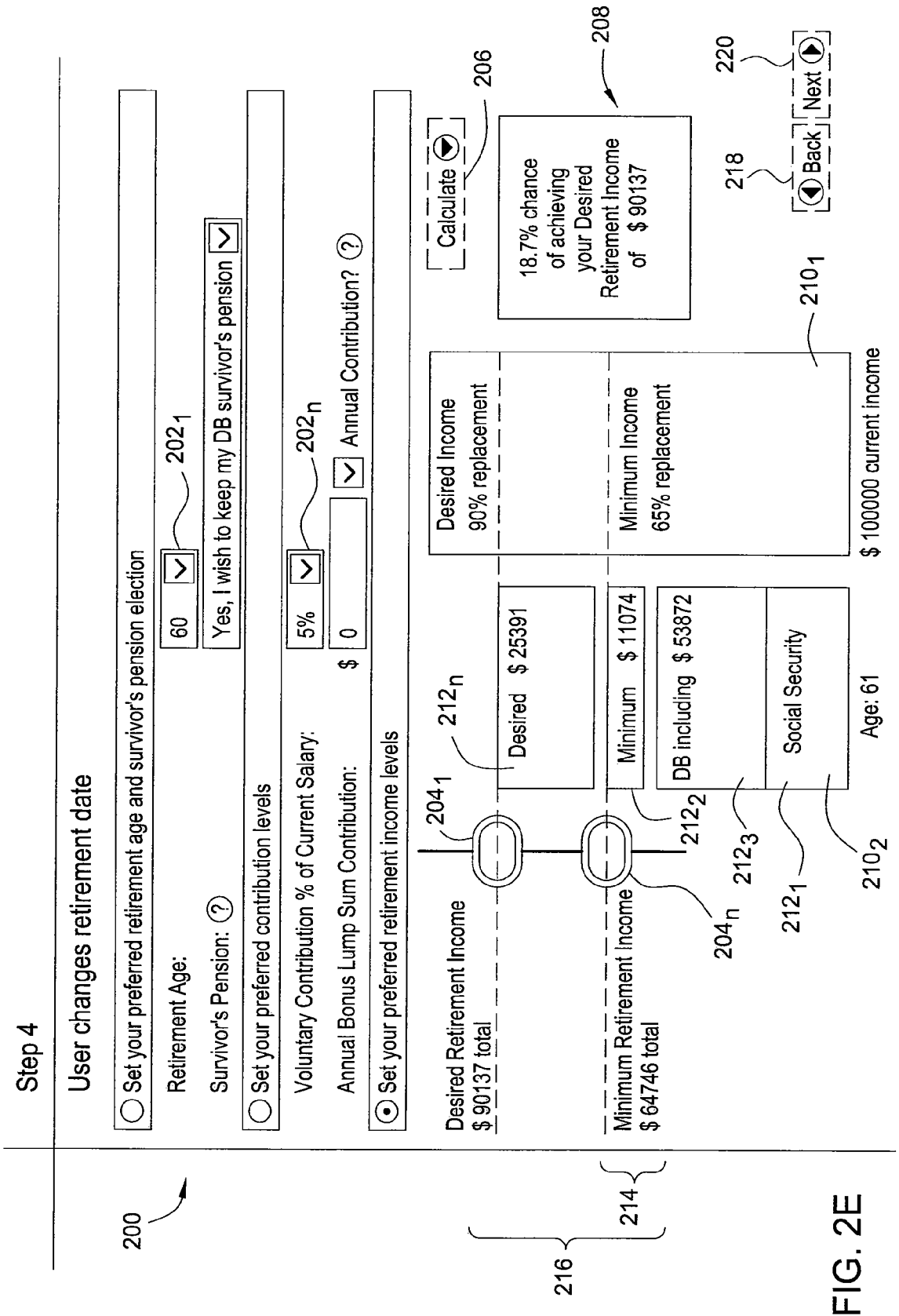

FIG. 2E, on the other hand, illustrates the window 200 in which the user has modified the retirement age in order to determine the probability of achieving the desired income level if he or she retires earlier. Specifically, after lowering the minimum income level as described in FIG. 2B and raising the desired income level and voluntary contribution level as described in FIG. 2C and FIG. 2D, the retirement age level has been lowered (e.g., to 60), for example by selecting from the drop-down menu of the input field $202_1$. The recalculated probability of achieving the desired income level is now lowered (e.g., 18.7% of achieving).

Figure 2F:
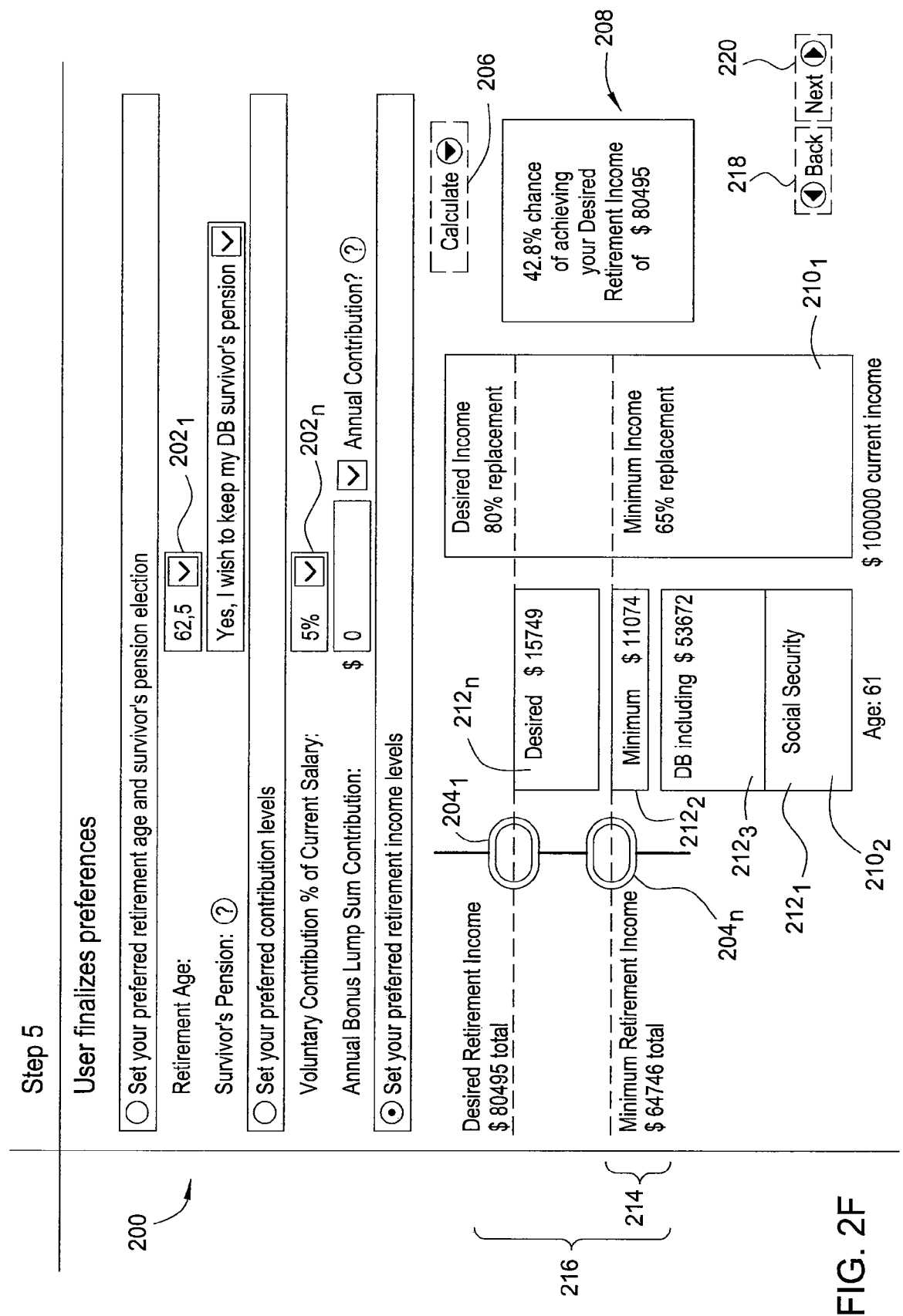

FIG. 2F, finally, illustrates the window 200 in which the user has lowered the desired income level in order to determine the probability of achieving the desired income level.

Specifically, after lowering the minimum income level and the retirement age as described in FIG. 2B and FIG. 2E and raising the desired income level and voluntary contribution level as described in FIG. 2C and FIG. 2D, the desired income level has been lowered (e.g., back to $80,495 or 80% replacement of annual income), for example by dragging the slider $204_1$. The recalculated probability of achieving the desired income level is now improved (e.g., 42.8% of achieving).

In one embodiment, slides or windows similar to the window 200 as illustrated in FIGS. 2A-2E are presented to the user in the form of a tutorial, so that the user can understand the impacts of making certain changes before attempting to use the graphical user interface for his or her retirement planning. As described above, this information may also be conveyed in the graph region 208, for example in the form of a summary box or window. The summary window describes the effects of increasing or decreasing parameters including the minimum income level, the maximum (desired) income level, the retirement age and the voluntary contribution level (e.g., in the examples illustrated, the summary window described the impact on the likelihood of achieving the desired income level).

FIG. 3A illustrates one embodiment of a second window 300 of a graphical user interface for retirement planning. The window 300 may be implemented, for example, in conjunction with the pension driver $102_n$ of FIG. 1, for managing the individual's "payout phase" of retirement planning (e.g., by constructing and funding an income stream for retirement).

In one embodiment, the window 300 is configured to determine what shortfall, if any, will exist between the user's income and the user's expenses, post-retirement, based on his or her stated projected income and expenses. To this end, the window 300 comprises a plurality of user input fields $302_1$-$302_n$ (hereinafter collectively referred to as "input fields 302"), a plurality of selectors $304_1$-$304_n$ (hereinafter collectively referred to as "selectors 304") and at least one add button 306 or 312, which allows the user to add additional input fields.

The selectors 304 are adapted to allow the user to choose whether to provide income information in a simplified (e.g., selector $304_1$) or detailed (e.g., selector $304_2$) form. The simplified form allows the user to input his or her post-retirement income as a lump sum; the detailed form allows the user to input his or her post-retirement income in an itemized form.

The input fields 302 are adapted to receive user input regarding retirement income. In one embodiment, input fields are activated (e.g., enabled so that a user can provide information) based on the selection of one of the selectors 304. For example, if the simplified selector $304_1$ is chosen, a single input field $302_1$ is activated for user input as a lump sum. Alternatively, if the detailed selector $304_2$ is chosen, a plurality of input fields $302_2$-$302_n$ is activated for user input in itemized form. In one embodiment, this plurality of input fields 302 includes input fields for at least one of: pre-retirement gross income, expected pension income, estimated Social Security income, investment income, part-time income, rental income and spouse's income (e.g., from the same sources mentioned above), among others. An additional input field $302_{14}$ for income sources not listed may also be provided. Additional input fields 302 may be provided for listing assets such as 401k and defined contribution plans, individual retirement accounts (IRAs), cash balance plans, Roth IRAs, Life Insurance plans, savings accounts, checking accounts, real estate, investments and other assets. In one embodiment, the input fields 302 are open style fields, where the user can enter any specific amount. In another embodiment, information received in an input field 302 may be shared with other input fields 302. Although the input fields 302 are described as receiving user input, it will be appreciated that at least some of the input (e.g., salary, voluntary contributions, etc.) could be fed by the user's employer.

The add buttons 306 and 312 comprise buttons adapted to allow the user to add additional input fields 302 (e.g., in addition to the input fields 302 that are automatically provided by the window 300).

In further embodiments, the window 300 may include a calculation button or other mechanism (not shown) for triggering a calculation upon selection by the user. For example, once the user has provided all of his or her income information using the input fields 302, he or she may click on the calculation button in order to indicate that he or she is finished entering the income information. Selecting the calculation button then causes a calculation of the total income based on the information provided. This total may be used later, as described in more detail below, to determine the user's post-retirement shortfall between income and expenses. Alternatively, the total may automatically refresh (e.g., in real time) as the user enters information in the input fields 302.

In addition, the window 300 may include a "back" button 308 and a "next" button 310. The back button 308 may, for example, allow the user to go back and modify certain preliminary input information. The next button 310 allows the user to finalize information entered in the input fields 302, if the user is satisfied that the information is accurate and complete.

Windows configured in a manner similar to the window 300 may allow the user to enter information concerning post-retirement expenses, current assets and current and/or post-retirement tax bracket.

FIG. 3B illustrates one embodiment of another portion 350 of the second window 300 of a graphical user interface for retirement planning. In particular, the portion 350 allows a user to enter information related to expected expenses. To this end, the portion 350 comprises a plurality of user input fields $352_1$-$352_n$ (hereinafter collectively referred to as "input fields 352"), a plurality of selectors $356_1$-$356_n$ (hereinafter collectively referred to as "selectors 356") and at least one add button 354, which allows the user to add additional input fields.

Like the selectors 304, the selectors 356 are adapted to allow the user to choose whether to provide income information in a simplified (e.g., selector $356_1$) or detailed (e.g., selector $356_2$) form. The simplified form allows the user to input his or her post-retirement expenses as a lump sum; the detailed form allows the user to input his or her post-retirement expenses in an itemized form.

The input fields 352 are adapted to receive user input regarding retirement expenses. In one embodiment, input fields 352 are activated (e.g., enabled so that a user can provide information) based on the selection of one of the selectors 356. In one embodiment, this plurality of input fields 352 includes input fields for at least one of: mortgage or rent, loan payments, debt payments (e.g., credit cards), alimony and/or child support, education expenses, household/utility expenses, food, clothing and personal care, transportation, insurance, medical expenses and taxes (e.g., property taxes, incomes taxes, etc.). An additional input field $352_{12}$ for income sources not listed may also be provided. In one embodiment, the input fields 352 are open style fields, where the user can enter any specific amount. In another embodiment, information received in an input field 352 may be shared with other input fields 352. Although the input fields 352 are described as receiving user input, it will be appreciated that at least some of the input (e.g., salary, voluntary contributions, etc.) could be fed by the user's employer.

The add button 354 comprises a button adapted to allow the user to add additional input fields 352 (e.g., in addition to the input fields 352 that are automatically provided by the portion 350).

Figure 4:
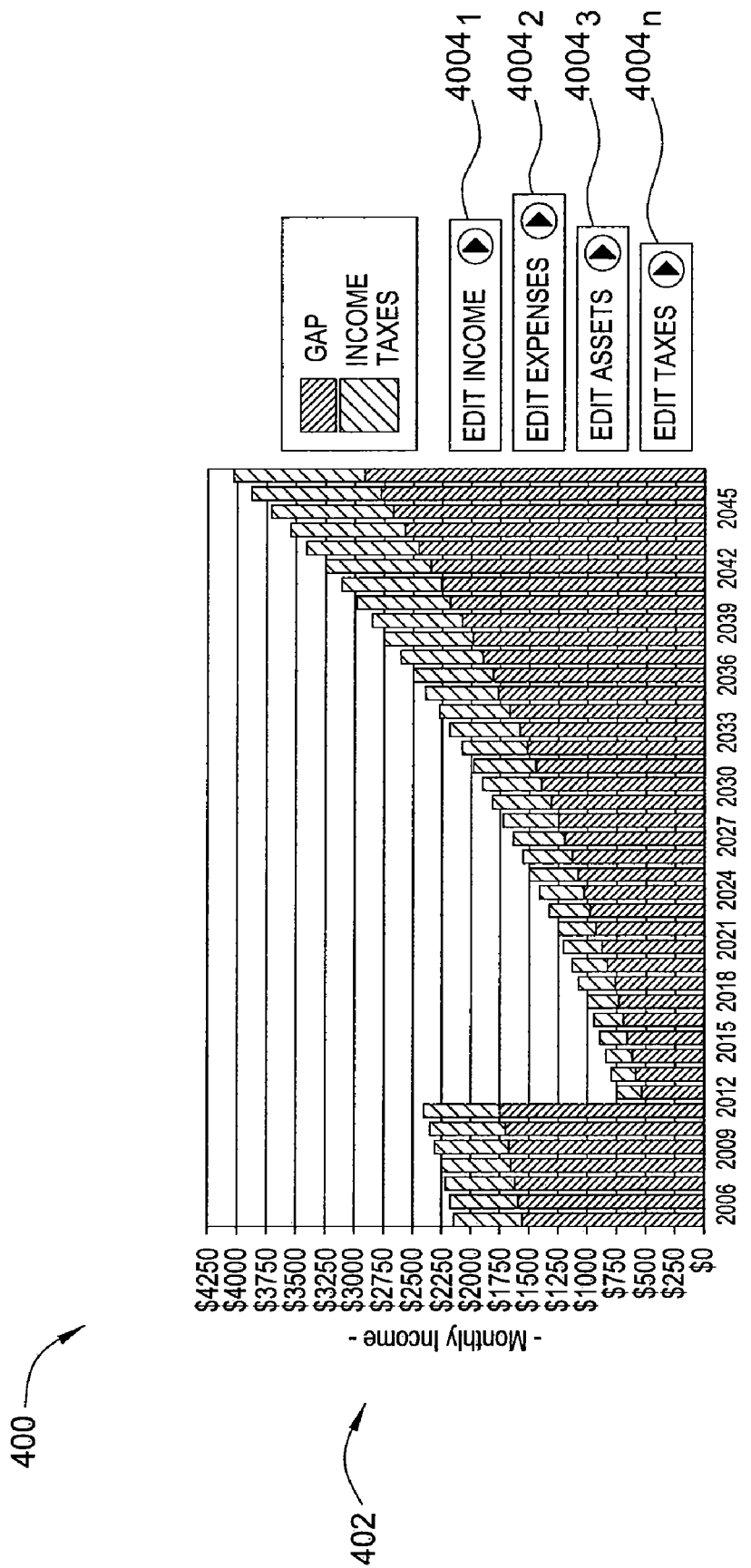
FIG. 4 illustrates one embodiment of a third window of a graphical user interface for retirement planning.

FIG. 4 illustrates one embodiment of a third window 400 of a graphical user interface for retirement planning. The window 400 may be implemented, for example, in conjunction with the savings driver $102_3$ of FIG. 1 for managing the "accumulation phase" of retirement planning (e.g., by helping the user determine how to allocate funds among investments to optimize accumulation).

Specifically, the window 400 is configured to calculate and display the user's post-retirement shortfall between income and expenses, based on information input into, for example, the window 300 and similar windows. The window 400 comprises at least one graph region 402 and a plurality of edit buttons $404_1$-$404_n$ (hereinafter collectively referred to as "edit buttons 404").

The graph region 402 comprises a region in which the window 400 provides a graphical or visual display that communicates the user's post-retirement shortfall. In one embodiment, this display is a bar graph style display comprising a bar for each year of the user's retirement. In particular, each bar plots a given year versus the average monthly shortfall corresponding to that year. The bars may alternatively provide shortfall information for other periods of time, such as one bar for every month, etc. The bars may illustrate both the absolute gap between income and expenses, plus the expected income taxes.

The edit buttons 404 provide hyperlinks that allow a user to go back and edit the information provided concerning at least income, expenses, assets and taxes (e.g., as input into the window 300 and similar windows). For example, the user may wish to go back and reconsider his or her expenses based on the information provided by the visual display of the shortfall.

In one embodiment, a summary section (not shown) summarizes, e.g., in tabular form, the shortfall or absolute gap, the income taxes and the total shortfall for each year of the user's retirement.

FIG. 5 illustrates one embodiment of a fourth window 500 of a graphical user interface for retirement planning. The window 500 may be implemented, for example, in conjunction with the savings driver $102_3$ of FIG. 1 for managing the "accumulation phase" of retirement planning (e.g., by helping the user determine how to allocate funds among investments to optimize accumulation).

Specifically, the window 500 is configured to calculate and display a solution to the user's post-retirement shortfall between income and expenses, based on information calculated, for example, by the window 400. The window 500 comprises at least one graph region 502, at least one summary section 504 and at least one solution section 506.

The graph region 502 is similar to the graph region 402 of FIG. 4 and comprises a region in which the window 500 provides a graphical or visual display that communicates the user's post-retirement shortfall, as well as the proposed solution to offset this shortfall. In one embodiment, this display is a bar graph style display comprising a bar for each year of the user's retirement. In particular, each bar plots a given year versus the average monthly shortfall corresponding to that year. The bars may alternatively provide shortfall information for other periods of time, such as one bar for every month, etc. The bars may illustrate both the absolute gap between income and expenses, plus the expected income taxes. In addition, a line type graph may be superimposed over the bar graph to illustrate the advantage of a proposed solution to offset the shortfall.

The summary section 504 provides a summary of the shortfall picture. In one embodiment, the summary section 504 provides values for the total lifetime shortfall, lifetime payout of a proposed solution (e.g., an annuity), the value of assets that may be used to fund the proposed solution and the surplus of assets (e.g., after funding the proposed solution).

The solution section 506 provides information concerning one or more proposed solutions to offset the calculated shortfall. For example, the solution section may provide the costs of solutions to offset shortfalls up to a plurality of different ages (e.g., up to 85 years of age, up to 90 years of age, up to 95 years of age, etc.).

In addition, the window 500 may comprise a "back" button 508 and a "next" button 510. The back button 508 allows the user to go back to a previous window, e.g., to modify information provided therein if the information provided in the window 500 does not suit the user's retirement planning goals. The next button 510 allows the user to select or finalize the solution proposed in the window 500 to offset the post-retirement shortfall.

FIG. 6 illustrates one embodiment of a fifth window 600 of a graphical user interface for retirement planning. The window 600 may be implemented, for example, in conjunction with the savings driver $102_3$ of FIG. 1 for managing the "accumulation phase" of retirement planning (e.g., by helping the user determine how to allocate funds among investments to optimize accumulation).

Specifically, the window 600 is configured to obtain and display quotes from a plurality of insurance providers specifying a price to purchase an annuity to offset the user's post-retirement shortfall, for example, as calculated by the windows 400 and 500. The window 600 comprises a plurality of provider quotes $602_1$-$602_n$, identified by the insurance carrier providing the quote (e.g., Provider A, Provider B, etc.).

Each provider quote 602 is associated with a corresponding selection button 604 that enables the user to select or purchase the annuity provided by that provider. Thus, the window 600 in essence displays a real-time auction for institutionally priced annuities.

Thus, the present invention represents a significant advancement in the field of retirement planning. In particular, the present invention integrates a plurality of financial drivers in order to assist an individual in managing his or her assets and targeted needs (e.g., income, savings, home, medical, etc.) to ensure a desired standard of living, both while working and while retired. In one embodiment, assets and risks are managed in a manner that provides an income stream upon retirement, the income stream providing the financial means to support the desired standard of living.

While the foregoing is directed to embodiments of the invention, other and further embodiments of the invention may be devised without departing from the basic scope thereof.

What is claimed is:

1. A graphical user interface for guiding a user through a planning of an income stream, the graphical user interface comprising:

one or more user input fields for receiving data from the user, the data relating to user preferences regarding the income stream; and at least one graph region for graphically displaying to the user a likelihood that the user will achieve a desired outcome based on the data provided to the one or more user input fields, wherein the at least one graph region comprises:
a bar graph comprising:
a first bar illustrating a current income of the user; and
a second bar that is divided into a plurality of regions, wherein the plurality of regions comprises:
a first region illustrating an expected post-retirement income of the user;
a second region illustrating a minimum post-retirement income level of the user; and
a third region illustrating a desired post-retirement income level of the user;
wherein a first gap between the first region and the second region illustrates a first difference between the expected post-retirement income of the user and the minimum post-retirement income level and a second gap between the first region and the third region illustrates a second difference between the expected post-retirement income and the desired post-retirement income level.

2. The graphical user interface of claim 1, wherein the one or more user input fields are configured to receive at least one of: a desired retirement age of the user or a voluntary contribution level of the user.

3. The graphical user interface of claim 1, wherein the one or more user input fields each comprise a drop down menu providing a plurality of options from which the user may select one.

4. The graphical user interface of claim 1, further comprising:
a first mechanism for allowing the user to provide a desired income level; and
a second mechanism for allowing the user to provide a minimum income level.

5. The graphical user interface of claim 4, wherein at least one of the first mechanism and the second mechanism comprises a slidable button that may be dragged to a desired level on a display, wherein movement of the slidable button causes a visual appearance of at least one of the first region and the second region on the display to change.

6. The graphical user interface of claim 1, further comprising:
a mechanism for triggering, upon selection by the user, a calculation based on the data provided by the user, the calculation indicating the likelihood that the user will achieve the desired outcome.

7. The graphical user interface of claim 1, further comprising:
a summary window for describing to the user an impact on the likelihood that the user will achieve the desired outcome based on a change to data provided by the user.

8. The graphical user interface of claim 1, wherein the one or more user input fields are configured to receive data regarding one or more post-retirement income sources of the user.

9. The graphical user interface of claim 8, wherein the one or more user input fields includes an input field for at least one of: a pre-retirement gross income of the user, an expected pension benefit of the user, an estimated Social Security benefit of the user, investment income of the user, part-time income of the user, rental income of the user, a pre-retirement gross income of a spouse of the user, an expected pension benefit of a spouse of the user, an estimated Social Security benefit of a spouse of the user, investment income of a spouse of the user, part-time income of a spouse of the user or rental income of a spouse of the user.

10. The graphical user interface of claim 1, wherein at least one of the one or more user input fields is an open field into which any data may be input.

11. The graphical user interface of claim 1, further comprising:
a mechanism for allowing the user to add at least one additional user input field.

12. The graphical user interface of claim 1, wherein the graph region further comprises:
an illustration depicting a shortfall, the shortfall comprising a difference between expected post-retirement income of the user and expected post-retirement expenses of the user.

13. The graphical user interface of claim 12, wherein the illustration depicts the shortfall on a year-by-year basis for one or more expected years of a retirement period of the user.

14. The graphical user interface of claim 12, further comprising:
one or more regions for displaying a quote from an insurance provider, the quote comprising a cost of an annuity that will offset the shortfall.

15. The graphical user interface of claim 14, wherein the one or more regions display corresponding quotes in substantially real time in response to a user solicitation for quotes.

16. The graphical user interface of claim 15, wherein the corresponding quotes are displayed in the form of an annuity auction.

17. The graphical user interface of claim 15, further comprising:
a mechanism for allowing the user to purchase a quote from among one or more quotes displayed in the one or more regions.

18. The graphical user interface of claim 1, wherein the first region is further divided into a plurality of sub-regions, each of the plurality of sub-regions illustrating a specific source of the expected post-retirement income and an amount of the expected post-retirement income derived from the source.

19. The graphical user interface of claim 1, further comprising:
a plurality of edit buttons, wherein each of the plurality of edit buttons provides a hyperlink to an interface through which the user can edit information inputted into a selected one of the one or more user input fields, such that the user can selectively edit particular categories of the user preferences.

20. A method for guiding a user through a planning of an income stream, the method comprising:
displaying one or more user input fields;
receiving, via the one or more user input fields, data from the user, the data relating to user preferences regarding the income stream;
determining, by a computer, in accordance with the data, a likelihood that the user will achieve a desired outcome; and
displaying the likelihood through graphical means, wherein displaying the likelihood comprises:
displaying a bar graph comprising:
a first bar illustrating a current income of the user; and
a second bar that is divided into a plurality of regions, wherein the plurality of regions comprises:
a first region illustrating an expected post-retirement income of the user;
a second region illustrating a minimum post-retirement income level of the user; and
a third region illustrating a desired post-retirement income level of the user;

wherein a first gap between the first region and the second region illustrates a first difference between the expected post-retirement income of the user and the minimum post-retirement income level and a second gap between the first region and the third region illustrates a second difference between the expected post-retirement income and the desired post-retirement income level.

* * * * *